(12) United States Patent
Beckmann et al.

(10) Patent No.: US 7,089,021 B2
(45) Date of Patent: Aug. 8, 2006

(54) METHOD AND SYSTEM FOR DETERMINING THE POSITION OF SUBSCRIBER DEVICES OF A RADIO COMMUNICATION SYSTEM USING ADDITIONAL POSITIONING ELEMENTS

(75) Inventors: Mark Beckmann, Braunschweig (DE); Siegfried Bär, Unterschleissheim (DE); Thomas Gottschalk, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 51 days.

(21) Appl. No.: 10/484,337

(22) PCT Filed: Jul. 2, 2002

(86) PCT No.: PCT/DE02/02406

§ 371 (c)(1),
(2), (4) Date: Mar. 16, 2004

(87) PCT Pub. No.: WO03/009626

PCT Pub. Date: Jan. 30, 2003

(65) Prior Publication Data

US 2004/0137910 A1    Jul. 15, 2004

(30) Foreign Application Priority Data

Jul. 17, 2001    (DE) ................. 101 34 590

(51) Int. Cl.
*H04Q 7/20* (2006.01)
(52) U.S. Cl. ............... 455/456.2; 455/456.1; 455/456.5; 455/450
(58) Field of Classification Search ..... 455/456.1–457, 455/404.2, 450–452.2
See application file for complete search history.

(56) References Cited

U.S. PATENT DOCUMENTS 5,901,358 A * 5/1999 Petty et al. ............... 455/456.2
6,882,852 B1 * 4/2005 Kasapidis ................. 455/456.1

FOREIGN PATENT DOCUMENTS

| EP | 1 091 611 | 4/2000 |
| EP | 1 091 611 A1 | 4/2001 |
| WO | WO 00/69199 | 11/2000 |

OTHER PUBLICATIONS

XP-002217588 "3G TR25.923 v1.1.0 (Aug. 1999) Report on Location Services" Aug. 20, 1999.
XP-002217588—3rd Generation Partnership Project (3GPP); Technical Specification Group (TSG) RAN; Working Group 2 (WG2); Report on Location Services (LCS), pp. 1-53, Aug. 1999.

* cited by examiner

*Primary Examiner*—Nick Corsaro
*Assistant Examiner*—Jaime Holliday
(74) *Attorney, Agent, or Firm*—Bell, Boyd & Lloyd LLC

(57) ABSTRACT

In a cellular radio communication system, at least one locating measuring signal is emitted by at least one additional positioning element from at least one radio cell. According to the invention, each positioning element monitors the radio signalizing on the common air interface of the respective base station to see whether a positioning inquiry signal is emitted to said station and/or from said station. When detecting a positioning inquiry signal of said type, a monitoring positioning element of said type independently inserts at least one locating measuring signal into at least one free signal section of the radio signaling.

11 Claims, 3 Drawing Sheets

METHOD AND SYSTEM FOR DETERMINING THE POSITION OF SUBSCRIBER DEVICES OF A RADIO COMMUNICATION SYSTEM USING ADDITIONAL POSITIONING ELEMENTS

BACKGROUND OF THE INVENTION

The present invention relates to a method for determining the position of at least one subscriber device of a radio communication system which has a number of base stations respectively associated with a number of radio cells, with at least one locating measuring signal being transmitted by at least one additional position element from at least one radio cell.

In radio communication systems, such as, for example, those according to the GSM or UMTS standard, it may, if appropriate, be of interest to determine the current location of a specific subscriber device, in particular, a mobile radio device. The requirement of the position of the respective subscriber device to be determined may arise from the respective subscriber himself/herself, from another subscriber or from the network infrastructure side.

SUMMARY OF THE INVENTION

The present invention is, therefore, directed toward a method and system in which the position of the respective subscriber device in a radio communication system can be determined as efficiently as possible. This is achieved in a method of the type mentioned at the beginning, and in an associated system, by virtue of the fact that the radio signaling on the air interface of the respective base station is monitored by the respective position element to determine whether a position interrogation signal is forwarded to this base station and/or forwarded by it, and that, when such a position interrogation signal is detected by such a position element which is listening in, at least one locating measuring signal is automatically transmitted during at least one free signal section of the radio signaling on the air interface of the base station to the radio cell assigned to the respective position element.

As a result of the fact that the respective position element in the radio cell in which the subscriber device to be respectively located is present at that particular time and/or the adjacent radio cell listens to the signaling on the air interface for any position interrogation signal, and when such a position interrogation signal is detected, such a "listening-in" position element independently inserts and transmits at least one locating measuring signal during at least one free signal section of the radio signaling on the air interface of the base station to the assigned radio cell of the position element, the determination of the position is made possible in an effective way. This is because complex additional signaling, such as would be necessary with a previously defined (i.e., rigid or fixed assignment of locating measuring signals to free time slots of the signaling on the air interface), can now be eliminated by the independent insertion of the locating measuring signals into free signal sections by the respectively involved position element. As a result, flexible utilization of free signaling sections on the air interface is made possible. A reduction in the originally-provided radio cell capacity, or transmission rate, and thus a restriction in the transmission of useful signals/useful data is thus largely avoided. This is because it is possible to dispense with having to make available, in advance, permanently assigned signal sections which are specially reserved for the transmission of locating measuring signals.

Additional features and advantages of the present invention are described in, and will be apparent from, the following Detailed Description of the Invention and the Figures.

BRIEF DESCRIPTION OF THE FIGURES

Elements with the same functioning and method of operation are respectively provided with the same reference symbols in FIGS. 1 to 4.

DETAILED DESCRIPTION OF THE INVENTION

Figure 2:
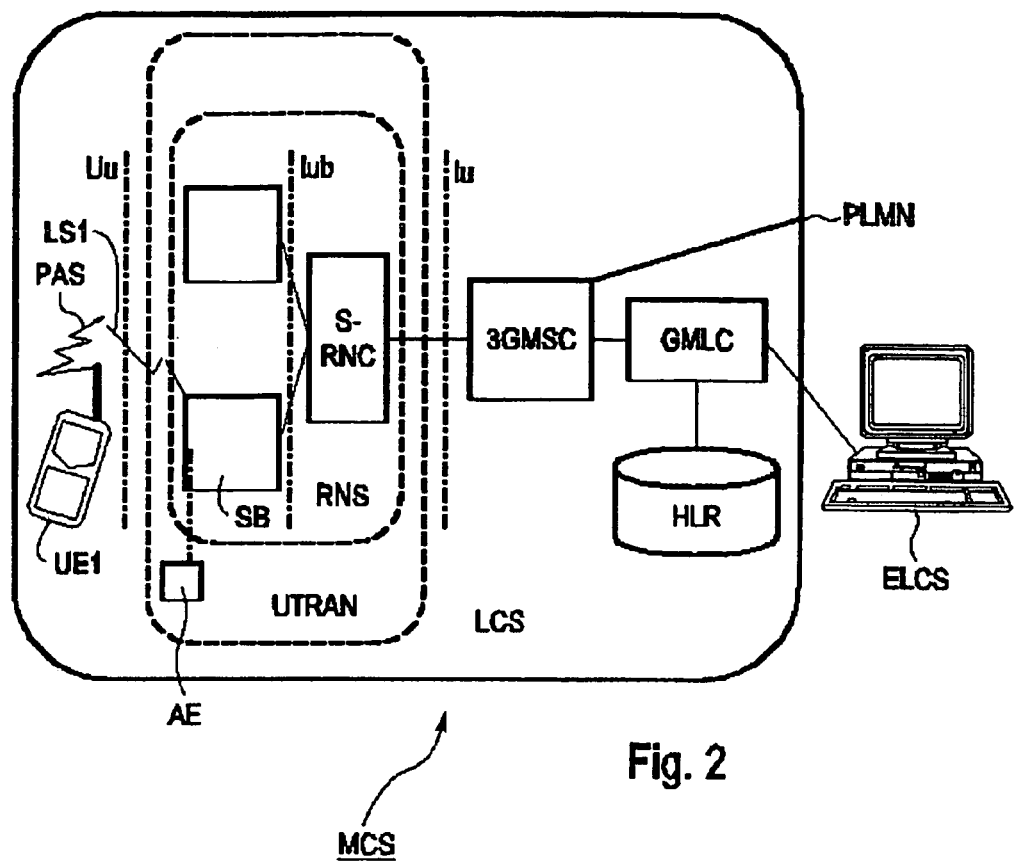
FIG. 2 is a schematic view of further components of the radio communication system according to FIG. 1.

A simplified radio communication system MCS is illustrated for the sake of clarity in FIG. 2, in which telecommunication signals are transmitted through at least one predefined air interface (LS1) via link Uu between at least one subscriber device (in particular, a mobile radio device such as, for example, UE1), and at least one base station (such as, for example, NB, SB0 using a time-division multiplex multiple-access transmission method. The system is preferably embodied as a mobile radio system according to the UMTS (Universal Mobile Telecommunication System) standard in which telecommunication signals are transmitted via the respective air interface; in particular, in accordance with a combined TDMA/CDMA multiple-access transmission method (TDMA=Time Division Multiple Access; CDMA=Code Division Multiple Access). In particular, it is operated in what is referred to as the TDD (Time Division Duplex) mode. In the TDD mode, separate signals for transmission are brought about in the uplink and downlink directions (Uplink=signal transmission from the mobile radio device to the respective base station, Downlink=signal transmission from the respectively assigned base station to the mobile radio device) via a corresponding, separate allocation of time slots according to a time-division multiplex method. Here, preferably, only a single carrier frequency is used for signal transmission in the uplink and downlink directions. In order to be able to bring about subscriber separation, the telecommunication signals are, expressed in simple terms, divided over time into a number of successive time slots with a predefinable time period with a predefinable time frame structure during the radio transmission via the air interface of the respective subscriber device to the assigned base station (and visa versa). A number of subscribers which communicate simultaneously in the same radio cell with the base station there are preferably separated, in combination with the time multiplex division, from one another in terms of their telecommunication/data connections using orthogonal codes; in particular, using what is referred to as the CDMA (Code Division Multiple Access) method.

The subscriber devices provided are preferably mobile radio telephones; in particular, mobile phones. In addition, it is also possible, as subscriber devices, for other telecommunication and/or data transmission devices with an assigned radio unit (transmitter and/or receiver unit) such as, for example, an internet computer, television sets, notebooks, fax machines, etc., for "on air" communications traffic (i.e., via an air interface), to be components of the radio communication network. The subscriber devices may, if appropriate, also be arranged here in a stationary, (i.e., fixed), fashion in the radio network. Preferably, they may also be of portable design and thus can be mobile; i.e., be used in different locations.

The mobile system MCS usually has a number of base stations which are each assigned mobile radio cells; i.e., each base station produces one radio cell each and supplies it, in terms of radio traffic, via at least one air interface. Within such a radio cell, its base station is therefore respectively responsible for communication with the subscriber device which is respectively present therein. The respective base station is preferably arranged approximately in the center of its radio cell (see FIG. 1).

Here, in the exemplary embodiment in FIG. 2, only two base stations NB, SB are shown for the sake of clarity, the base stations being representative of the number of other base stations which are present in the radio network. A subscriber device UE1 which is to be located is present in the radio cell of the base station SB. In particular, the subscriber device UE1 (User Equipment), expressed in general terms, is a physically mobile, (i.e. portable) terminal for telecommunication. A base station is in each case a network component which serves, and, if appropriate, monitors mobile terminals in a mobile radio cell of at least one air interface.

The base station SB here in FIG. 2 is that network component which is currently serving and monitoring the mobile terminal UE1 to be located in the radio cell in which it is present at that particular time (i.e., a serving mobile radio cell), via the air interface LS. The base stations such as, for example, NB, SB can, in turn, be combined into groups and connected via a fixed network connection Iub to a subordinate network unit SRNC (Serving Radio Network Controller) which, using a protocol RRC (Radio Resource Control=protocol for transmitting messages between a mobile subscriber device and Serving Radio Network Controller), organizes and monitors the communication/data traffic between the respective mobile subscriber device and the respectively assigned base station. What is referred to as a Serving Radio Network Controller is, therefore, a network component for serving and monitoring one or more base stations which are called NodeBs in UMTS. The respective Serving Radio Network Controller and the base stations assigned to it form what is referred to as a radio network system (RNS). A number of RNS systems are, in turn, combined in UMTS to form a logic system unit UTRAN (Universal Terrestrial Radio Access Network). The switching unit 3GMSC (:3$^{rd}$ Generation Mobile-services Switching Center) establishes the interface between the radio system MSC and fixed networks such as, for example, PLMN (Public Land Mobile Network) via a fixed link Iu. The MSC carries out all the necessary functions relating to this for circuit switched services from and to the mobile stations. A communications link for an external location application (for example, position determining) or an external location client (LCS client) is made possible via a connection unit GMLC (Gateway Mobile Location Center). This connection unit GMLC is connected to what is referred to as a "Home Location Register" HLR to which a mobile user is assigned for protocol and monitoring purposes (for example, user information). An external locating unit such as, for example, an LCS client ELCS (location services) application system (for example, emergency call centers, monitoring centers, position-dependent information services) can enter into contact with the radio communication system MCS via the connection unit GMLC.

In the traffic state which is given by way of example in FIG. 2, the mobile radio device UE1 has already set up an active, existing communication link to the base station SB in the radio cell in which it is located. As a result, telecommunication signals or data signals can be transmitted both from the base station SB to the mobile radio device UE1 (=downlink) and from the mobile radio device UE1 to the base station SB (=uplink). An evaluation/arithmetic unit AE is connected to the base station SB using network elements which are not shown in FIG. 2 for the sake of clarity. The unit AE can be used to carry out the calculation or determination of positions (PCF=Position Calculating Function) of the mobile radio device (UE1) on the basis of the measurement data. This evaluation/calculation unit also may be implemented as a component of the respective base station and/or in the respective mobile radio device UE1 itself.

Figure 1:
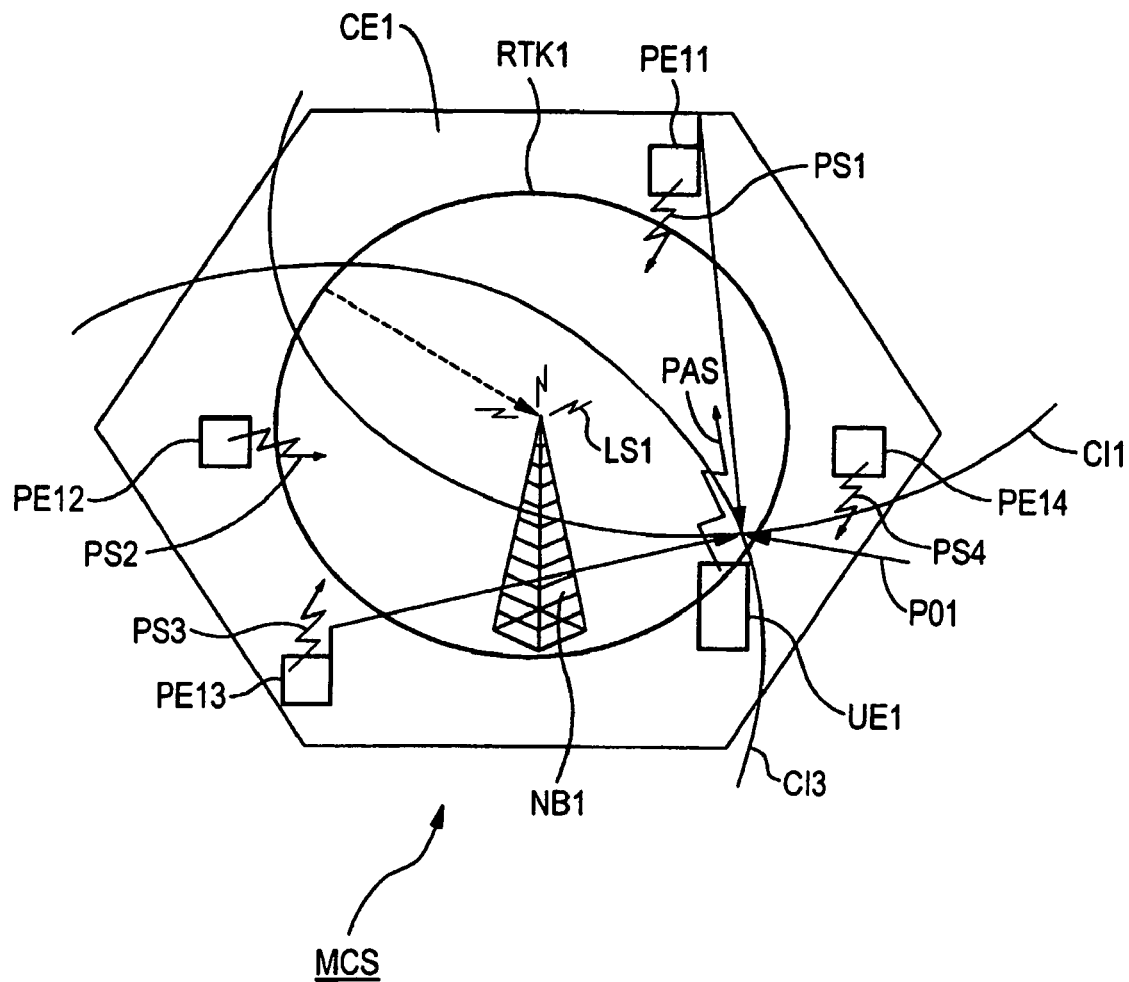
FIG. 1 is a schematic view of a radio cell of a radio communication system in which position elements can be used to determine the position of a mobile radio device which is located therein according to a first embodiment of the method of the present invention.

FIG. 1 shows, by way of example, the radio cell CE1 from the number of radio cells of the radio communication system according to FIG. 2. This radio cell is supplied, in terms of radio equipment, by the approximately centrally arranged base station NB1. In order to be able to determine the position, or location, of the mobile radio device UE1 which is present in the radio cell CE1 at a given time, a number of position elements such as, for example, PE11 to PE14 are additionally arranged distributed in the radio cell CE1.

The positive elements are preferably placed in the region of the external boundaries of the radio cell CE1. Tn order to determine the position of the mobile radio device UE1, on the one hand, the base station NB1 itself now transmits, via its air interface LS1, one or more associated locating measuring signals PS1 to PS4 whose respective transit times are measured for their respective transit paths to the mobile radio device UE1, and determines therefrom a distance circle RTK1 around the base station NB1 as a center point (what is referred to as RTT (round trip time) measurement). The mobile radio device UE1 is located on this circle RTK with a constant radius. In order to further delimit its location, one or more locating measuring signals are transmitted simultaneously, or each offset chronologically by a known time period, by at least two additional position elements such as, for example, PE11 and PE13. At least two further distance circles CI1 and CI3 are determined via the mobile radio device UE1, using corresponding transit time measurements of these locating measuring signals. Here, the distance circle CI1 characterizes those locations at which a locating measuring signal of the position element PE11 has in each case the same transit time for its transit path to the mobile radio device UE1. The distance circle CI3 describes those locations at which a locating measuring signal of position element PE13 has, in each case, the same transit time for its transit path to the mobile radio device UE1. Only the point of intersection of all three distant circles RTK1, CI1, CI3 gives the location of the mobile radio device UE1 unambiguously.

The position elements PE11 to PE14 are expediently synchronized with respect to the timing pattern of the radio signaling on the air interface LS1 of the base station NB1. This is because, in this way, the starting time of the locating measuring signals of the position elements is defined unambiguously, which facilitates the evaluation of the transit times of the locating measuring signals.

In addition to or independently of the circles CI1, CI3, it is also optionally possible to determine local hyperbolas on the basis of the locating measuring signals, as in what is referred to as the OTDOA (Observed Time Differences of Arrival) method.

More details on this method can be found in 3G TSGR1#8 (99)g57: Positioning method proposal, PANASONIC, New York (USA), TSG RAN1 Meeting#8, 12-15.10.1999, 3G TSGR2#8(99)e48: Positioning method proposal PANASONIC, Cheju (Korea), TSG RAN2 Meeting#8, 2-5.11.1999, 3G TSGR2#15-R2-001718: Assessment procedure for the OTDOA-PE positioning method, PANASONIC, Sophia Antipolis (France), TSG RAN2 Meeting#15, 21-25. 8.2000.

To summarize, the essence of this position-determining method is that one or more position elements (PE), with whose support position determinations can be carried out according to the principle of the OTDOA method, are introduced per mobile radio cell. The number of position elements is defined by the network operator, preferably in accordance with the local conditions (for example, topography) of the respective mobile radio cell and the required accuracy of the position determining process.

With the PEs it is possible to use, for position-determining purposes, the signals of only that mobile radio cell in which the UE to be determined is present. Signals of other NodeBs (in the adjacent mobile radio cells) for the OTDOA evaluation are basically no longer necessary. However, they also can, of course, be used if they are present and detected.

The PEs preferably have two main functions:
  a) listening to the mobile radio cell traffic in the downlink direction, (i.e., to the transmission from the NodeB to the mobile radio devices, or user equipment (UEs)); and
  b) transmitting a predefined signal code, assigned to each position element, to the mobile radio devices in the downlink direction.

The listening and transmitting are carried out at a frequency, in particular the downlink frequency of the mobile radio cell (serving cell). This is, for example, the frequency of the broadcast channel BCH. Both operations, however, of listening and transmitting, are preferably separated from one another chronologically so that overlapping cannot and should not occur.

If a request for position determination of a mobile radio device is present in a radio cell, the position elements which are respectively present in the mobile radio cell are informed by the respectively associated base station or serving NodeB (via higher signaling layers or via the BCH), to transmit their assigned signal code in a specific downlink slot (DL slot).

The transmission of the locating measuring signals could now take place at specific times and in specific, free signal sections of the DL slot of the transmission signal of the serving NodeB to the mobile radio devices; i.e., the position elements could place their uniquely defined signal code sequences in signal sections, predefined by the respective serving NodeB, of the signaling of the serving NodeB to the mobile radio devices of this mobile radio cell. It would be possible, for example, for these to be signal sections of the BCH which are not used by it or signal sections in the still unused data part of a slot. The respective subscriber device which is to be located also would, of course, be aware in this case of the signal sections in which the position elements transmit their signal codes. As a result, the respective subscriber device which is to be located could attempt, in accordance with the signaling time, to detect the signal codes of the PEs in the specific part of the DL slot and, in doing so, determine the arrival times of the signal codes. The further procedure and determination of the position could take place in accordance with the known OTDOA method.

In this procedure, the position elements would configure themselves via the respective base station or serving Node B of the radio cell in which the mobile radio device to be respectively located is present at that particular time; i.e., the serving NodeB would inform the position elements of the time in the DL slot (downlink connection between NodeB and UE) at which the position elements may transmit the signal code sequences assigned to them. With this rigid (i.e., fixed), assignment, the following problem, in particular, could occur given unfavorable configurations:

The position elements (PEs) cannot detect the configuration information in the BCH owing to poor mobile radio channel conditions, (i.e., cannot evaluate the information), and thus do not have any possible way of transmitting their signal code sequences with the correct timing (insertion start times) of the DL connections.

The following cases, for example, are unfavorable configurations in the sense of the present invention:
  (a) total utilization/overloading of the capacity of the mobile radio channels of the respective mobile radio cell; and
  (b) a mobile radio cell which is too heavily populated/built on, resulting in strong multipath propagation of the signals.

As a result, the reception of the respective PE signal code may be incomplete or only take place in "fractions." Incorrect detection of the PE signal code in the receiver is possible. This would lead to the supporting of the determination of positions using position elements of one or more mobile radio devices (UEs) in the respective mobile radio cell being made very difficult, or even being impossible.

An effective, simple and reliable way of determining position is now possible, even under such poor transmission conditions, by virtue of the fact that at least one position element monitors and, in particular, two position elements monitor, the radio signaling on the air interface of the respective base station to determine whether a position interrogation signal is forwarded to such base station and/or by it, and that, when such a position interrogation signal is detected by such a listening-in position element, at least one locating measuring signal is independently transmitted during at least one free signal section of the radio signaling on the air interface of the base station of the radio cell assigned to such position element.

The quintessence here is the "interception" of or listening to the position requests of the UEs (user equipment=for example, a mobile radio device) to the relevant serving RNC via the serving NodeB. The information relating to the determination of a position is provided by an information element, location update in the RRC message (RRC=Radio Resource Control) relating to the connection setup between the UE and NodeB (detailed explanations in the exemplary embodiments), and can be listened to in the surroundings of the UE which transmitted this position request. As soon as one or more PEs monitor a position request, they automatically transmit their signal code sequences assigned to them in free, already existing signal sections of the signaling of the NodeB to the UEs.

As the assignment of the maximum 240 signal codes (in particular, the 240 unused S-SCH codes (Secondary Synchronization Channels; in UMTS, of 256 channels made available only 16 are allocated and used) to corresponding PEs of the mobile radio network is known in advance to the UEs via the BCH (transmitted by the NodeBs or the higher signaling layers in the case of, for example, the first radio contact=logging on), it is possible for the UEs in the serving cell to listen to the signal codes of the PEs from the adjacent cells.

After a position request PAS (see FIG. 1) has been emitted, the UEs advantageously attempt, after a brief delay phase (which results from the time which a PE requires to "listen to" the request and then transmit its signaling code), to detect the known PE signal code sequences without the time of the free signal sections being explicitly signaled to them by the NodeB. The possibility of providing information about free signal sections of the NodeB to the UEs for, for example, PE code sequences is, if appropriate, still possible if desired, requested or required.

An important advantage, which is not to be underestimated, is the possibility of reducing the signaling overhead of the NodeB to the UEs or PEs in the serving cell as, of course, the position elements now automatically insert locating measuring signals into free signal sections (already present) of the radio signaling. When the PEs act "automatically" during the listening to a position interrogation by a UE to the serving NodeB (location request) in the serving cell, the signaling between PEs and serving NodeB can be eliminated or avoided in terms of time and signaling; i.e., a disruptive signaling overhead in the cell can be avoided.

If, according to a further embodiment, only a specific number of PEs transmit their signal code sequences into the serving cell, in particular only those position elements which are in the vicinity of the mobile radio device or "listen to" the position request, and not all possible PEs which are located in the radio cell, further savings in terms of signaling overhead also can be made. (Both the abovementioned advantages are dealt with in more detail in exemplary embodiment 1 and illustrated.)

Another advantage to be noted is the possibility of using PEs from the adjacent mobile radio cells if the latter "listen to" the position request of a UE from an adjacent cell. However, this requires the PEs to be configured in such a way that they have knowledge of the spread codes of the NodeBs of the adjacent cells. This is the only way that it is possible for the PEs in the adjacent cells to discover the free signal sections of the NodeBs in order to place their own signal code sequences suitably for determining positions. (This advantage is considered in more detail in exemplary embodiment 2.)

In this way, the availability of the determination of position and its accuracy cannot be reduced but rather, on the contrary, can be increased. With the present method it is also possible to dispense with specially provided signal sections which are already allocated in advance, such sections being referred to as IPDLs (idle period downlink) in the known OTDOA-IPDL method. In this way, any loss of radio capacity due to possible IPDLs can be avoided. As a result, the network operator can reach his/her target capacity even with the additional service feature "determining the position of UEs".

The method according to the present invention may be used both in the FDD (frequency division duplex) mode and in the TDD (time division duplex) mode of UMTS.

EXEMPLARY EMBODIMENT 1

According to FIG. 1, the base station NB1 covers the UMTS mobile radio cell CE1 (UMTS cell 1). Adjacent radio cells should not play any role in the first exemplary embodiment. This NodeB is controlled according to FIG. 2 by means of an RNC. Together with the latter, a part of a radio system with control element, base station, mobile radio devices and position elements is thus produced.

The mobile radio device UE1 which is to be located is present in the UMTS mobile radio cell CE1, the serving cell, and is supplied or served by this base station NB1. Here, the interrogation PAS for determining a position may originate either from the mobile radio device UE1 itself or from one or more network components of the radio communication system; thus, from any interrogating LCS client in the network of the radio communication system (FIG. 2). In particular, the fact that the mobile radio device UE1 sets up an RRC link to the base station or NodeB NB1 in every case, in order to confirm the position request PAS to the base station NB1, is relevant here.

Furthermore, a certain number of position elements (PEs) are present in the UMTS mobile radio cell CE1 (UMTS cell 1). In detail, these are the elements PE11, PE12, PE13 and PE14. The PE distribution in the UMTS mobile radio cell CE1 (UMTS cell 1) is performed in such a way that at least the signals of two PEs can be satisfactorily "listened to" (i.e., detected), by the mobile radio device UE1 in the radio cell CE1. In general, the PEs are preferably positioned in such a way that the locating measuring signals of all the PEs, as far as possible, in total cover 100% of the UMTS mobile radio cell CE1 (UMTS cell 1) in conjunction with the NodeB NB1.

According to FIG. 1, the mobile radio device UE1 is present in the UMTS mobile radio cell CE1 (UMTS cell 1) near to the right-hand cell boundary so that there is the possibility that when there is a position interrogation it can evaluate locating measuring signals of the nearest position elements PE13 and PE14. In contrast, problems relating to the detection of the signals of the other PEs which are too far away (for example, PE11 and PE12) may occur because these PEs are difficult for the mobile radio device to detect, or cannot be detected by it at all. The reasons are the relatively large distances and, as a result, weaker signal power and possibly quantitatively more shadowing in the distance between the PEs and the mobile radio device UE1.

A sequence scenario, by way of example, may be as follows:

The position of the mobile radio device UE1 in the UMTS mobile radio cell CE1 (UMTS cell 1) is to be determined on the basis of a position interrogation PAS. It is not relevant here why and from where a position interrogation occurs. Independently of the precision of the determination of position which is defined in the request, which position is decided by the network (mainly by the RNC), the mobile radio device prepares itself to use position elements (PEs); i.e., to monitor the signaling codes of the PEs of the mobile radio cell CE1. Firstly, the NodeB NB1 is informed, using a confirmation of the position interrogation PAS. The NodeB can, if appropriate, additionally inform the PEs of the mobile radio cell, via the BCH, about the times when the respective PE inserts its signal code (assigned to it) in the DL slot structure from the NodeB to the UE. This information can be used by the PEs, in particular, after a first attempt at determining a position has failed, for example. This information also is, of course, also signaled to the UE as the UE also monitors the DL connection of the serving NodeB (NodeB).)

The position interrogation is also known to the PEs in the vicinity of the UE to be localized, by virtue of the aforesaid "listening" or "interception" of the information element (location update) in the RRC message. After this information element has been evaluated, the position elements PE11, PE12, PE13 and PE14 then insert, independently of "instructions" of the serving NodeB (NodeB), their signal code sequences as locating measuring signals into the respective DL slot structure into free signal sections; i.e., in idle time sections of the radio signaling on the air interface LS1. The mobile radio device UE1 attempts to determine reception times of the code sequences using the knowledge of the signal code sequences and of the associated position element (via, for example, a rake receiver=correlation receiver, with which time shifts due to correlations can be determined). This information is transmitted by the mobile radio device UE1 to the serving NodeB (NodeB). The NodeB or the PCF (Position Calculation Function) in the UTRAN then determines from this time differences between the reception times of the PE signal code sequences. These differences are preferably mapped onto location hyperbolas and/or distance circles in accordance with the known ODTOA method. The common point of intersection of the hyperbolas is the searched-for position in an accuracy value range which is dependent on the environment.

Figure 3:
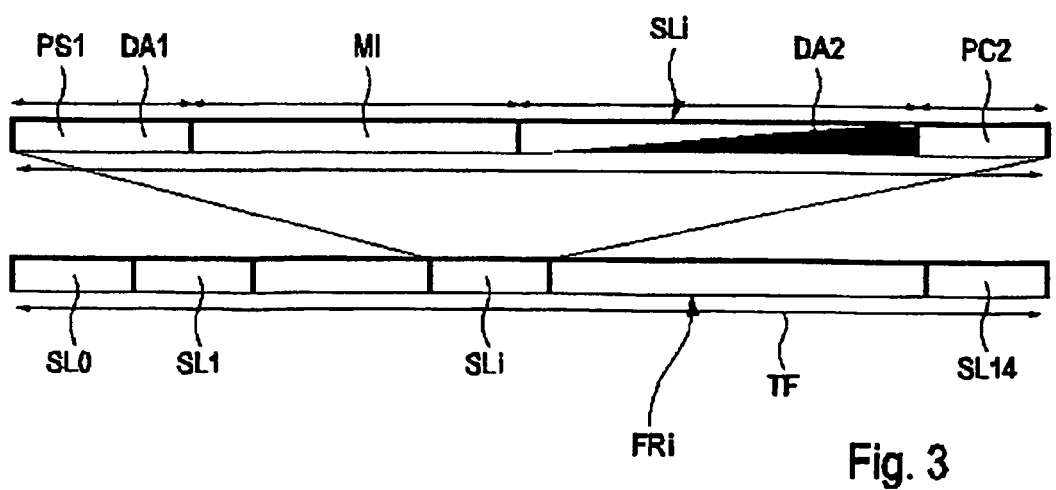
FIG. 3 is a schematic view of the chronological structure of a time frame of the radio signaling on the air interface between a base station and a subscriber device, to be located, of the radio communication system, in accordance with FIGS. 1 and 2, with a locating measuring signal from a listening position element having been inserted independently into a free signal section of a time slot of this time frame according to the method of the present invention.

FIG. 3 shows a schematic view of the timing structure of a time frame FRi of the radio signaling on the air interface LS1 between the base station NB1 and the mobile radio device UE1 to be located in FIG. 1. Here, a locating measuring signal has been automatically inserted by a monitoring position element into a free signal section of a time slot of this time frame using the method according to the present invention. The time frame FRi of the chronological length TF has a number of individual, chronologically successive time slots SL0 to SL14 of, in each case, the same, constant time period. Such time frames follow one another successively (i.e., continuously), during the telecommunication transmission. This is indicated in FIG. 3 by, in each case, three points at the start and end of the time frame FRi. The structure of the time frame FRi preferably corresponds to the slot structure of what is referred to as a TDD frame (TDD=time division duplex, frame=time frame). A TDD frame such as, for example, FRi is composed here of a total of 15 time slots SL0 to SL14. Each time slot can be allocated (i.e., reserved or made available), in a uniquely defined way either for transmissions in the uplink traffic or downlink traffic.

FIG. 3 is a schematic view of the timing structure; i.e., the chronological division of a time slot such as, for example, SLi of the time frame FRi. The respective time slot, such as, for example, SLi has 4 time sections DA1, MI, DA2, PC2 which are reserved for the transmission of various groups of signal types. The first time section DA1 of the time slot SLi is preassigned for the transmission of useful data, referred to as data symbols. Then, in the second, following time section or block, MI, what are referred to as midambles, are transmitted. These are signals for the channel estimation and/or synchronization of the respective subscriber device and/or of the respective base station. On the basis of these channel estimation parameters, in particular, channel equalization is carried out in the respective mobile radio device and/or the respective base station. This time block MI is, in turn, followed by a time section DA2 for a further transmission of useful data. By virtue of the fact that the midambles for the channel estimation are transmitted between the two blocks with the useful data or useful signals, it is largely ensured that the respective radio channel can be equalized in an optimum way when averaged over time. During the fourth, last time section PC2 of the time slot SLi, finally, no transmission of signals is performed; i.e., this so-called guard period is unassigned in order to have a safety time gap between the individual, chronologically successively transmitted time slots. As a result, particularly disruptive signal overlaps or interference between successive slots as a result of signal transit time differences, such as, for example, during multipath propagation, are substantially avoided so that satisfactory signal detection is largely ensured. Considered overall, the radio transmission of what is referred to as a burst with predetermined chronological divisionor sectioning therefore can take place during the respective time slot. Detailed information on the time frame structure or time slot structure is provided in the respective mobile radio standard, in the exemplary embodiment here, in particular in the UMTS standard (For example, 3G TS 25.211 "physical channels and mapping of transport channels onto physical channels (TDD)", Version 3.2.0 (2000-03), 3G TS 25.305 "stage 2 functional specification of location services in UTRAN", Version 3.1.0 (2000-03, 3G TS 25.224 "physical layer procedures (TDD)", Version 3.2.0 (2000-03).)

In the exemplary embodiment of FIG. 3, the signaling code PS1 of one of the position elements such as, for example, PE11 is transmitted, by way of example, during the time section DA1 in the time slot SLi of the time frame FRi, as a free signal section was available here.

EXEMPLARY EMBODIMENT 2

Figure 4:
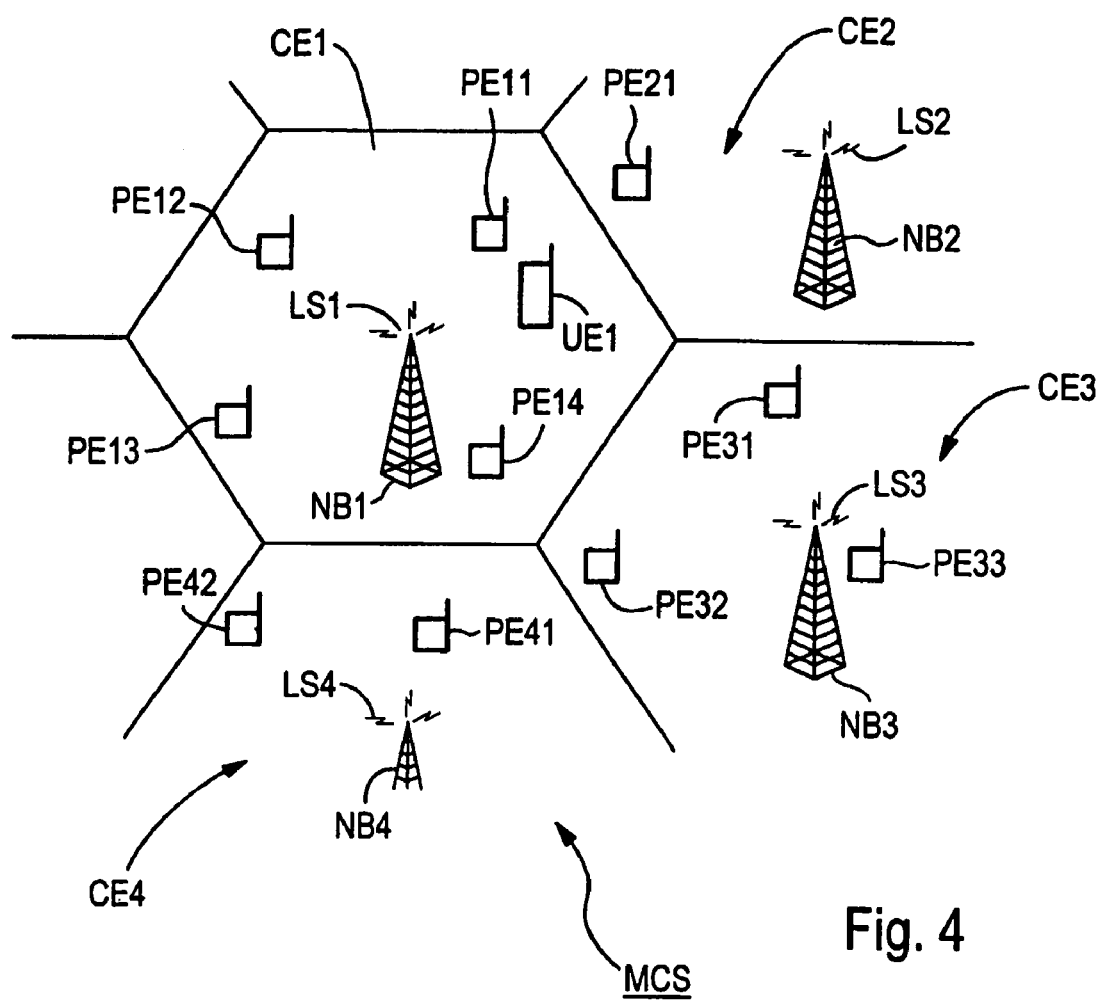
FIG. 4 is a schematic view of a further embodiment of the method according to the present invention for determining the position of a subscriber device of the radio communication system according to FIG. 2.

Exemplary embodiment 2 according to FIG. 4 is based on the above exemplary embodiment 1 in terms of its fundamental principle. The difference with respect to FIG. 1 is, however, the use of position elements (for example, PE21/ PE31, PE32, PE33/PE41, PE42) of adjacent radio cells (CE2, CE3, CE4) for determining a position for the case of the "listening to" or "interception" of the information element (location update) in the RRC message (radio request control). That is to say, if PEs of the adjacent mobile radio cells (UMTS CEx, for example, where x=1–4) are also provided with the information element, the PEs should then react, irrespective of whether they are serving their own mobile radio cell or the adjacent cells.

A sequence scenario could be, by way of example, as follows:

The position of the mobile radio device UE1 in the UMTS mobile radio cell CE1 (UMTS cell 1) is to be determined on the basis of a position interrogation PAS. Here, it is not relevant why, and from where, a position interrogation PAS was submitted. Irrespective of the accuracy, defined in the interrogations, of the determination of the position, which accuracy is determined by the network (mainly by the RNC), the UE prepares itself to use position elements (PEs); i.e., to listen to the signaling codes of the PEs of the mobile radio cells CE1–CE4. Firstly, the NodeB NB1 is provided with a confirmation of the position interrogation PAS. (The NodeB additionally may inform the PEs of the mobile radio cell, via the BCH, about the points in time when the respective position element (abbreviation PE) can insert its signal code (assigned to it) into the DL slot structure from the NodeB to the UE. This information can be used by the PEs, for example, after a first attempt at determining a position has failed. This information also is, of course, signaled to the UE as the UE is also monitoring the DL link of the serving NodeB (NodeB$_1$).)

The position interrogation is also known to the position elements (PEs), specifically PE11 and PE14 from the mobile radio cell CE1 (UMTS cell 1) in which the mobile radio device is present at that particular time, PE21 from the adjacent mobile radio cell CE2 (UMTS cell 2) and PE 31 and possibly PE32 from the adjacent mobile radio cell CE3 (UMTS cell 3) in the vicinity of the mobile radio device UE1 to be located, by "listening to" or "intercepting" the information element (location update) in the RRC message. After this information element has been evaluated, the aforesaid PEs then insert, independently of "instructions" of the serving NodeB (NodeB NB1) (i.e., automatically) their signal code sequences into the respective DL slot structure of the UMTS mobile radio cell CE1 (UMTS cell 1) in free, given time sections; i.e., time sections which are, in any case, already present. As such, of course, the PEs of the adjacent cells CE2 and CE3 must expediently also have the information relating to the free signal sections.

The mobile radio device UE1 attempts to determine reception times of the code sequences using the knowledge of the signal code sequences and the associated PE (via, for example, a rake receiver=correlation receiver, with which time shifts can be determined through correlations). This information is transmitted by the UE1 to the serving NodeB (NodeB). The NodeB or the PCF in the UTRAN then determines from this time differences between the reception times of the PE signal code sequences. These differences are preferably mapped onto location hyperbolas and/or distance circles. Their respective common point of intersection is the searched-for position in an accuracy value range which is dependent on the environment.

The localization method which is described, by way of example, with reference to a UMTS radio communication system also can, of course, be applied in other radio communication systems such as, for example, those according to the GPRS (General Packet Radio Service), or EDGE (Enhanced Data Rates for GSM Environments) standard.

Although the present invention has been described with reference to specific embodiments, those of skill in the art will recognize that changes may be made thereto without departing from the spirit and scope of the present invention as set forth in the hereafter appended claims.

The invention claimed is:

1. A method for determining a position of at least one subscriber device of a radio communication system which has a plurality of base stations associated with a respective plurality of radio cells, the method comprising the steps of:
   monitoring, via a respective position element, radio signaling on an air interface of a respective base station to determine whether a position interrogation signal is at least one of forwarded to the respective base station by the subscriber device to be located and forwarded by the respective base station;
   detecting, via the respective position element, the position interrogation signal; and
   automatically inserting at least one locating measuring signal by the respective position element in at least one free signal section of the existing radio signaling on the air interface of the respective base station of the radio cell assigned to the respective position element, wherein the at least one locating measuring signal is inserted in direct response to detecting the position interrogation signal.

2. A method for determining a position of at least one subscriber device of a radio communication system as claimed in claim 1, wherein the signaling on the air interface is effected using a time-division multiplex method.

3. A method for determining a position of at least one subscriber device of a radio communication system as claimed in claim 2, wherein the time-division multiplex method is a time division duplex mode of a Universal Mobile Telecommunication System standard.

4. A method for determining a position of at least one subscriber device of a radio communication system as claimed in claim 1, the method further comprising the step of assigning a unique identification code to the locating measuring signal of the respective position element.

5. A method for determining a position of at least one subscriber device of a radio communication system as claimed in claim 1, wherein the subscriber device is a mobile telephone.

6. A method for determining a position of at least one subscriber device of a radio communication system as claimed in claim 1, wherein the locating measuring signal is transmitted by the respective position element during at least one unoccupied signal section of a broadcast channel of a base station of a radio cell assigned to the respective position element.

7. A method for determining a position of at least one subscriber device of a radio communication system as claimed in claim 1, wherein locating measuring signals of at least two position elements are used for determining the position of a subscriber device to be located.

8. A method for determining a position of at least one subscriber device of a radio communication system as claimed in claim 7, the method further comprising the step of synchronizing the at least two position elements with respect to a timing pattern of the radio signaling on the air interface of a base station of a radio cell assigned to the at least two position elements assigned.

9. A method for determining a position of at least one subscriber device of a radio communication system as claimed in claim 1, the method further comprising the step of determining and making available for evaluation a transit time of the locating measuring signal for its transit path between its respective position element and the subscriber device to be located.

10. A method for determining a position of at least one subscriber device of a radio communication system as claimed in claim 1, wherein the at least one locating measuring signal is automatically transmitted by at least one of at least one position element in the respective radio cell in which the subscriber device to be located is present and at least one additional position element of at least one adjacent radio cell.

11. A system for determining a position of at least one subscriber device of a radio communication system, comprising:
   a plurality of base stations associated with a respective plurality of radio cells;
   at least one subscriber device, of the radio communication system, which is to be located; and
   at least one position element for transmitting at least one locating measuring signal from at least one radio cell, wherein a respective position element monitors radio signaling on an air interface of a respective base station to determine whether a position interrogation signal is at least one of forwarded to the respective base station by the subscriber device to be located and forwarded by the respective base station, and wherein, when the position interrogation signal is detected by the respective position element, at least one locating measuring signal is automatically inserted by the respective position element in at least one free signal section of the existing radio signaling on the air interface of the respective base station of the radio cell assigned to the respective position element, wherein the at least one locating measuring signal is inserted in direct response to detecting the position interrogation signal.

* * * * *